United States Patent [19]
Franklin et al.

[11] Patent Number: 4,494,299
[45] Date of Patent: Jan. 22, 1985

[54] METHOD OF MANUFACTURING SOLID ELECTROLYTIC CAPACITORS

[75] Inventors: Robert W. Franklin, Paignton; Peter F. Briscoe, Littlebury Green, both of England

[73] Assignee: International Standard Electric Corporation, New York, N.Y.

[21] Appl. No.: 445,622

[22] Filed: Nov. 30, 1982

[30] Foreign Application Priority Data

Dec. 1, 1981 [GB] United Kingdom ............... 8136165

[51] Int. Cl.³ .............................................. H01G 9/00
[52] U.S. Cl. ...................................... 29/570; 361/433
[58] Field of Search ................... 29/570, 591; 361/433

[56] References Cited

U.S. PATENT DOCUMENTS 3,889,357  6/1975  Millard et al. ........................ 29/570
4,164,005  8/1979  Cheseldine ........................ 29/570 X
4,188,706  2/1980  Millard et al. ........................ 29/570

OTHER PUBLICATIONS

Millard, R. J. et al., "A New Tantalum Chip Capacitor" in *Proc. 28th Electronic Components Conference*, Anaheim, CA, Apr. 1978, pp. 422–426.

Primary Examiner—Brian E. Hearn
Assistant Examiner—Alan E. Schiavelli
Attorney, Agent, or Firm—John T. O'Halloran; Peter R. Ruzek; Mary C. Werner

[57] ABSTRACT

Solid electrolytic capacitors are made in a batch process by etching a tantalum foil to form a number of rows of teeth, screen-printing tantalum powder ink onto the teeth, processing the sheet through sintering, anodizing and manganesing stages, sequentially encapsulating opposite edges of the rows of teeth in conductive epoxy and the "gap" with insulating epoxy and separating the individual capacitors from the rows.

4 Claims, 5 Drawing Figures

METHOD OF MANUFACTURING SOLID ELECTROLYTIC CAPACITORS

BACKGROUND OF THE INVENTION

1. Field of the Invention

This invention relates to capacitors particularly solid electrolytic capacitors.

2. Description of the Prior Art

Solid electrolytic capacitors have sintered metal-powder slugs or foil anodes which have been subjected to an oxidation process—for example electrolytic anodization—to form a homogenous oxide film over the complete surface of the metal, and which provides the dielectric of the capacitor. In powder metal anodes a mass of powdered valve metal, usually tantalum, is compacted in a die and sintered to provide an individual anode. This method, unless expensive duplication of dies is undertaken, does not allow more than one anode to be made at a time.

A technique for screen-printing porous tantalum pads onto a tantalum substrate to make tantalum chip capacitors is described in the Proceedings of the 28th Electronic Components Conference, Anaheim, CA, pp. 422–426. The screen-printed substrate is sintered, anodized and then electrode connections are established. All processing including encapsulation is carried out before the substrate is finally diced to yield the individual capacitor.

Leadless capacitors can be manufactured according to this technique.

SUMMARY OF THE INVENTION

According to the present invention there is provided a method of manufacturing an electrical component comprising providing a conductive pattern defining several rows of projections, applying a body portion of a respective component to each respective projection, simultaneously further processing the projections with the applied body portions, separating the rows of projections from the sheet and applying electrical connections to each body portion to provide a row of complete electrical components, encapsulating the components simultaneously, and subsequently separating the components from one another and from the row.

According to another aspect of the invention there is provided a method of manufacturing a plurality of electrical components comprising forming a plurality of component bodies on a conductive pattern of a strip of material, applying a layer of conductive material in common to one side of the components of the strip to form one connection terminal, applying a second conductive layer to the opposite side of the components of the strip to form a second connection terminal, and applying an insulating layer of material to encapsulate the component bodies between the opposite terminals and subsequently separating the encapsulated components from one another and from the strip.

BRIEF DESCRIPTION OF THE DRAWINGS

In order that the invention can be clearly understood reference will be made to the accompanying drawings in which.

DETAILED DESCRIPTION OF THE INVENTION

Conventional solid tantalum capacitors comprise a porous sintered tantalum slug with an anode wire embedded therein, and the slug is anodized to produce tantalum pentoxide dielectric material. Contact with the dielectric is made with manganese dioxide which constitutes the cathode of the capacitor, and a silver paste forms an intermediate connection between a solder and the manganese dioxide. Although there are various modifications to this general technique, in general these capacitors are processed as individual components throughout manufacture.

Figure 1:
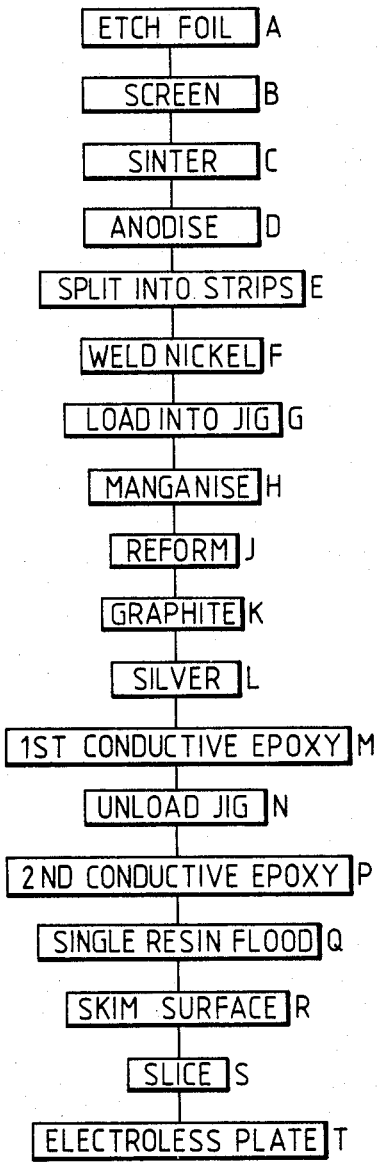
FIG. 1 is a flow chart for a process for making a tantalum chip capacitor according to an embodiment of the present invention.

FIG. 1 of the drawings shows an alternative technique for making leadless tantalum chip capacitors which exhibit the characteristics of small size and planar contacts such as are found in ceramic monolithic chip capacitors.

Figure 2:
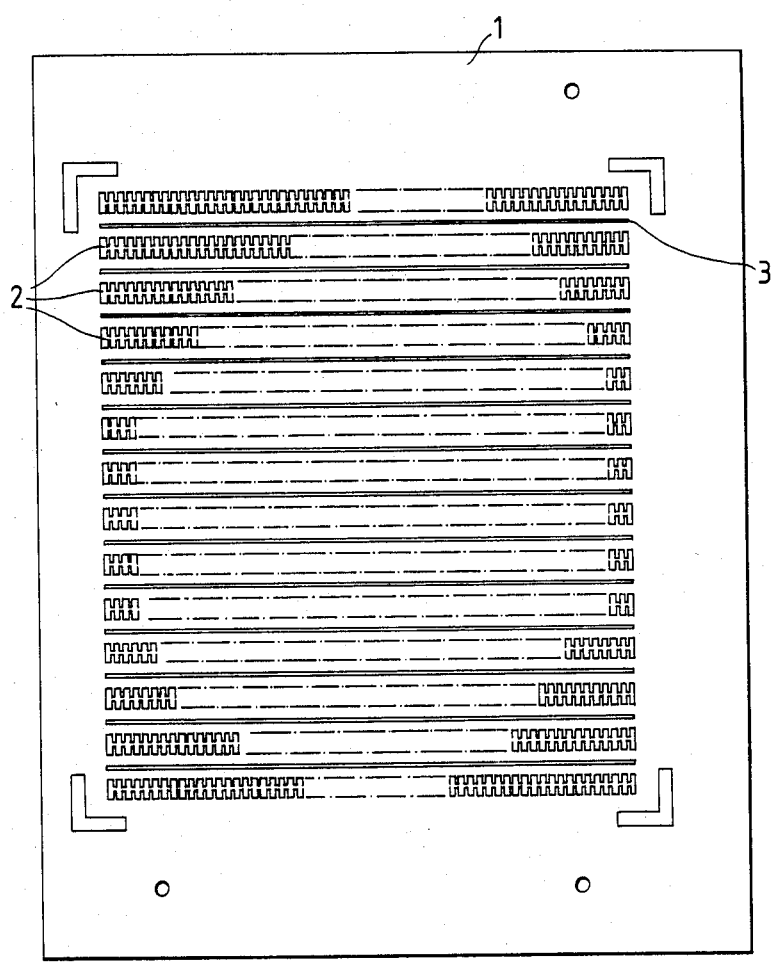
FIG. 2 shows an etched foil at a stage in the manufacture of a chip tantalum capacitor according to the embodiment of FIG. 1.

Referring to FIG. 2 the individual capacitor comprises a tantalum substrate 1 having a porous tantalum pad 2 on one surface. The capacitors are made by screen-printing porous tantalum pads onto the tantalum substrate using an ink comprising tantalum powder, a binder and a solvent. The layers are printed and solidified successively until pads of the desired thickness are formed. The pads are then vacuum-sintered.

Many pads can be printed on the substrate and can then be subsequently processed together, that is to say they can then be anodized to form a dielectric film and manganese dioxide contact medium can be applied using a solution of manganous nitrate subsequently converted to manganese dioxide by pyrolysis. The tantalum pentoxide dielectric is then healed by returning the array to an electrolyte and reanodizing. Cathode contacts are made by using colloidal graphite followed by application of a silver and/or copper paste. A layer of a conductive resin is then added to the silvered surfaces and the material is cured at elevated temperatures. The opposite side of the rows of pads is similarly embedded in conductive resin and the space between the two conductive layers is filled with an insulating resin. When cured this sandwich of three resin layers with the foil substrate embedded in it is diced into individual finished capacitors.

Referring now to FIG. 1 of the drawings there is shown a flow chart illustrating the process of manufacturing tantalum chip capacitors according to an embodiment of the invention.

Initially a tantalum foil 1 as shown in detail in FIG. 2, is etched using a conventional technique to produce rows of teeth such as 2. Each row of teeth is separated from the next adjacent row by an elongate aperture 3. The etching of the tantalum foil is indicated by step A in the flow chart of FIG. 1. Other valve metal foils can be used such as niobium. Furthermore instead of etching the pattern in the foil, the foil could be stamped.

Figure 3:
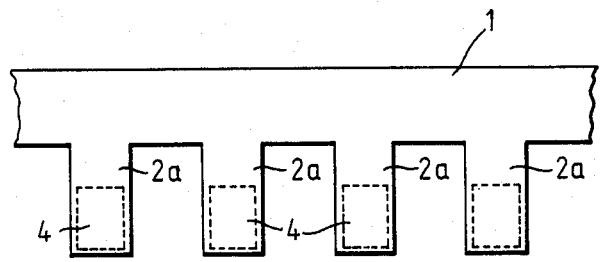
FIG. 3 shows a detail of the foil of FIG. 2 during a subsequent stage of the process.

In the next step, represented by B in the chart, the foil is screen-printed with a pattern of tantalum powder. As shown in FIG. 3 tantalum powder, made up in a vehicle of organic solvent and binder into a screen-printing ink, is deposited on to one side of the foil in specific areas such as 4 on respective teeth such as 2a of a row of teeth 2. As an example the patterned area shown in FIG. 2 could be of the order 100 mm square and could contain anything from 100 to 2000 capacitor sections.

Returning to the chart of FIG. 1 the next step, C, the foil plus the screened powder is sintered to remove the residue of the ink vehicle and to bond the powder to itself and to the foil. For tantalum a sintering temperature similar to that used in the manufacture of conventional compressed tantalum slugs, would be used, such as 1600° C. in an inert atmosphere.

Next in step, D, the sheet of anodes is anodized to form a dielectric (tantalum pentoxide) film of the desired thickness, using conventional voltage and current cycles.

Figure 4:
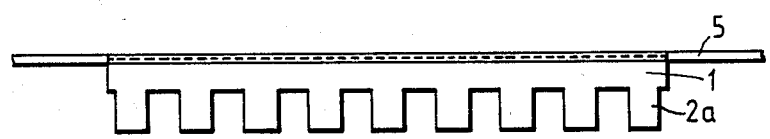
FIG. 4 shows the foil of FIG. 3 in a yet further stage of the process.
Figure 5:
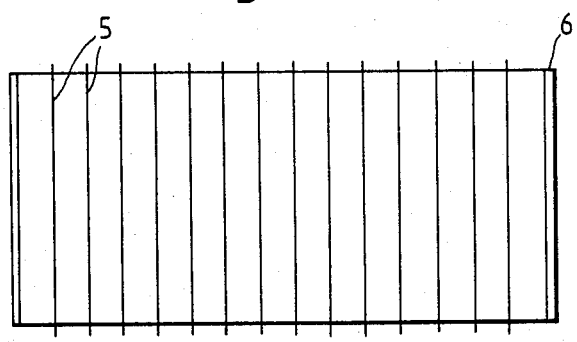
FIG. 5 shows a jig for the step G in FIG. 1.

In the next step, E, the sheets are cut away so that individual rows of capacitor sections become separated by the elongate apertures 3 and a nickel ribbon 5 shown in more detail in FIG. 4, is seam-welded to the foil 1 carrying a row of capacitor sections. These pieces are then loaded into a jig which holds all the lines or rows at the same level while at the same time masking the nickel and neighboring foil. This jig is indicated by reference numeral 6 in FIG. 5 carrying the welded nickel ribbons such as 5, FIG. 5 being basically a schematic plan view in which the capacitor sections hang down "through the plane of the paper".

Referring back to FIG. 1 the welding of the nickel ribbon is indicated by step F in the flow chart, and the step G represents loading the rows of capacitor sections into the jig.

Step H represents the manganising stage in which the foils in the jig 6 are dipped into manganese nitrate-solution and heated to pyrolyze the nitrate to form manganese dioxide. This stage is repeated several times as required. The foils are then reformed, in step J, using the ends of the nickel ribbon as the means of applying voltage to the foil.

Steps K and L in the flow chart represent graphiting and silvering, and this is applied by immersing the tips of the foils into suitable dispersions of graphite and silver (or similar conductive metal dispersion) and drying off the solvents in an air-drying furnace.

The next step, M, comprises partially immersing the foils, held on the jig 6, in a layer of conductive epoxy which is then cured to form a hard, thin sheet, typically 1-2 mm thick. The jig is then removed, step M, leaving the strips of foil standing upright in the hardened conductive epoxy layer, represented by step N.

The epoxy layer with the strips of foil standing upright in it is then inverted into a second layer of conductive epoxy, so that the opposite edge of the foils, including the nickel ribbons, is immersed, step P. This second resin is cured and this leaves a body with two layers of resin held apart by the lines or rows of foil running at right angles to the planes of the conductive resin layers.

This "sandwich" structure is loaded into a frame and the central gap is filled with insulating epoxy resin which is then cured, represented by step Q in the flow chart of FIG. 1.

The surfaces of the block are then skimmed to remove any excess resin, step R, and then the block is sliced to produce individual chip capacitors, step S. The solderability of the end terminations is improved by electroless plating with copper, step T, and then the ends are solder coated.

To aid polarity identification of the second conductive layer, its resin can contain particles of magnetic material, such as nickel.

The invention has been described by referring to one particular embodiment. It will be clear to those having ordinary skill in the art that modifications to that embodiment can be made within the scope of the present invention. It is not intended that this detailed description limit the scope of the invention, which is solely defined by the claims appended hereto.

We claim:

1. A method of manufacturing electrolytic capacitors comprising the steps of:

forming groups of elongate formations each having a plurality of teeth distributed along its length on a substrate of a valve metal;

applying a layer of a valve metal powder to one side of each of the teeth;

sintering the valve metal powder to form a valve metal layer;

anodizing the substrate and the metal layer to form a dielectric film;

separating each of the groups from the substrate;

manganizing the respective groups of formations at a predetermined region of each of the teeth;

immersing part of the teeth into a bath of conductive material to form a first termination thereon;

turning the respective groups so that the teeth extend in a direction opposite to that assumed during said immersing step;

immersing a portion of the remainder of each of the groups into a bath of a conductive material to form a second termination thereon to such an extent to leave a gap between the terminations; and filling the gap with an insulation material.

2. The method as claimed in claim 1, wherein the forming step includes etching a foil from the group consisting of tantalum and niobium.

3. The method as claimed in claim 1, wherein the applying step includes screen-printing a pattern of powder onto the substrate.

4. The method as claimed in claim 3 further comprising, after the applying step, sintering the valve metal layer.

* * * * *